UNITED STATES PATENT OFFICE.

WILLIAM J. MILES, JR., OF KANSAS, ILLINOIS.

COMPOUND FOR CONVERTING WROUGHT-IRON INTO STEEL.

SPECIFICATION forming part of Letters Patent No. 435,940, dated September 9, 1890.

Application filed April 19, 1890. Serial No. 348,695. (Specimens.)

*To all whom it may concern:*

Be it known that I, WILLIAM J. MILES, Jr., a citizen of the United States, residing at Kansas, in the county of Edgar and State of Illinois, have invented a new and useful Compound for Converting Wrought-Iron into Steel, of which the following is a specification.

My invention relates to a compound employed in the conversion of wrought-iron into the various grades of steel. By the use of the said compound the present invention provides for the conversion of wrought-iron into any form of steel—namely, high-grade or tool steel and steel having soft center, which is used for plows, safes, &c. The ingredients that are combined to form this composition are yellow prussiate of potash, glycyrrhizinum ammoniatum, and ammoniacum, combined in the following proportions: Yellow prussiate of potash, eight ounces; glycyrrhizinum ammoniatum, two ounces; ammoniacum, two ounces.

This compound is used in the ordinary "cementation process" of making steel, and in this connection in the manner herein described.

The bottom of the converting-pot is covered with a layer of charcoal one inch thick, and upon this is placed a layer of the metal to be converted. Now, by alternate layers of the charcoal and the metal respectively, the pot is filled evenly from bottom to top and is finally cemented over at top with ordinary fire-brick clay for the total exclusion of air, as is customary in such processes. At the junction of each layer of the metal and charcoal a separate layer of the described composition is also evenly spread between, thereby making an alternation of three distinct layers—namely, charcoal, metal, and the compound. The heat is applied to the filled "conversion-pot," as it is usually done in like processes, and according to the intensity of the heat and length of time to which said pot is subjected steel of the different grades desired is obtained, and the depth of penetration of the carbonaceous gases into the iron is thereby regulated.

The application of heat to this compound causes the elements in its constituents to separate and give off hydrycarbon gases, which penetrate the iron, together with the carbon of the charcoal, and render the carbonization of the same more complete and perfect, making steel of such a homogeneous and stable nature as to be easily worked at a very high temperature without endangering its properties.

Having described my compound and its method of employment, what I claim, and desire to secure by Letters Patent, is—

The herein-described composition of matter for facilitating and perfecting the conversion of wrought-iron into steel, consisting of yellow prussiate of potassium, glycyrrhizinum ammoniatum, and ammoniacum, used as described, and compounded substantially in the proportions specified.

In testimony that I claim the foregoing as my own I have hereto affixed my signature in presence of two witnesses.

WILLIAM J. MILES, JR.

Witnesses:
W. C. PINNELL,
J. H. SULLEE.